United States Patent [19]
Uehara et al.

[11] Patent Number: 5,084,796
[45] Date of Patent: Jan. 28, 1992

[54] DISC LOADING APPARATUS

[75] Inventors: Tsukasa Uehara, Tokyo; Masaya Maeda, Kanagawa, both of Japan

[73] Assignee: Canon Kabushiki Kaisha, Tokyo, Japan

[21] Appl. No.: 700,065

[22] Filed: May 1, 1991

Related U.S. Application Data

[60] Continuation of Ser. No. 545,110, Jun. 26, 1990, abandoned, which is a division of Ser. No. 296,295, Jan. 10, 1989, which is a continuation of Ser. No. 220,911, Jul. 18, 1988, abandoned, which is a continuation of Ser. No. 106,979, Oct. 2, 1987, abandoned, which is a continuation of Ser. No. 884,878, Jul. 8, 1986, abandoned, which is a continuation of Ser. No. 591,383, Mar. 20, 1984, abandoned.

[30] Foreign Application Priority Data

Mar. 25, 1983 [JP] Japan ............................ 58-50037
May 11, 1983 [JP] Japan ............................ 58-82353

[51] Int. Cl.$^5$ .......................................... G11B 17/022
[52] U.S. Cl. ........................................ 360/99.12
[58] Field of Search .................... 360/99.12, 99.05

[56] References Cited

U.S. PATENT DOCUMENTS
4,498,161 2/1985 Eisemann ...................... 369/75.2

FOREIGN PATENT DOCUMENTS
007057 1/1983 European Pat. Off. .

*Primary Examiner*—Robert S. Tupper
*Attorney, Agent, or Firm*—Toren, McGeady & Associates

[57] ABSTRACT

An apparatus arranged to use a flexible magnetic disc housed in a cassette and having a center core provided with an engaging hole, includes a disc rotating spindle having a flange and engageable with the hole at the center core of the disc, a cassette holder movable between a first position for receiving the cassette and a second position for positioning the received cassette at a predetermined position relative to the spindle, a pressing member for pressing the engaging portion of the disc against the flange of the spindle, and a control mechanism for operating the pressing member and thereafter disabling the pressing member during the movement of the cassette holder from its first to its second position.

12 Claims, 8 Drawing Sheets

DISC LOADING APPARATUS

This is a continuation application of Ser. No. 07/545,110, filed June 26, 1990, abandoned; which in turn is a Division application of Ser. No. 07/296,295, filed Jan. 10, 1989; which in turn is a continuation application of Ser. No. 07/220,911, filed July 18, 1988, abandoned; which in turn is a continuation application of Ser. No. 07/106,979, filed Oct. 2, 1987, abandoned; which in turn is a continuation of Ser. No. 06/884,878, filed July 8, 1986, abandoned; and which in turn is a continuation of Ser. No. 06/591,383, filed Mar. 20, 1984, abandoned.

BACKGROUND OF THE INVENTION

1. Field of the Invention

This invention relates to an apparatus using a disc-shaped record bearing medium, such as disc player.

2. Description of the Prior Art

In recording and/or reproducing apparatus using a rotation type record bearing medium of disc shape, for example, a rotation type flexible magnetic disc, rotation of the magnetic disc is performed after an engaging hole of the center core in the central portion of the magnetic disc has been engaged with a spindle which is driven to rotate by an electric motor. This type of apparatus displays a problem in that when the engagement of the center core with the spindle is loose, it becomes impossible to ensure that the magnetic disc undergoes normal rotative motion during recording or reproduction, and conversely when the aforesaid engagement is tightened, the magnetic disc becomes difficult to load on the spindle.

Therefore, as will be more fully described later with reference to FIG. 2, a method has been proposed wherein a magnetizable member is applied to the center core, while a magnet piece is mounted on the flanged portion of the spindle. However, even with such a magnetic coupling method, it is difficult to assure that when the center core is put on the spindle, it occupies a certain position relative to a reference surface, for example, the flange surface of the spindle. Therefore, it is difficult to hold the magnetic disc in a predetermined setting surface for maintenance of a predetermined aligning state between it and a recording and/or reproducing head. Also in a still picture recording and/or reproducing apparatus having a rigorous requirement for accuracy of alignment, the force necessary to load the center core on the spindle may amount to hundreds of grams. As the magnet piece is of large size, therefore, the size and weight of the apparatus is hindered from being reduced.

On the other hand, there has been proposed an apparatus provided with a mechanism for pressing a portion of the magnetic disc against the spindle as in a floppy disc device. Since, in this type of apparatus, that portion of the apparatus which drives rotation of the disc operates under the condition that the aforesaid mechanism applies a pressure on the spindle through the disc, its load becomes large, causing the speed of rotation to vary randomly.

SUMMARY OF THE INVENTION

It is, therefore, a main object of the present invention to eliminate the above-described drawbacks of the conventional apparatus and to provide an apparatus using a disc-shaped record bearing medium which apparatus is capable of assuring that when loading the disc-shaped record bearing medium, the record bearing medium is set on a rotative drive member accurately and reliably.

Another object of the present invention is to provide an apparatus using a disc-shaped record bearing medium which apparatus operates without having to apply a large load on the aforesaid rotative drive member while still permitting the aforesaid object to be accomplished, thereby providing an advantage in that the bulk and size of the rotative drive member can be reduced.

Still another object of the present invention is to provide an apparatus using a disc-shaped record bearing medium in which when the record bearing medium is loaded on a rotative drive member by operating a pressing member for pressing a portion of the record bearing medium against a receiving surface of the aforesaid rotative drive member, a reliable and smooth loading operation can be realized by a pressing force which is always almost constant despite the existence of configuration errors and fitting position errors of the pressing member, or of members constituting an operating mechanism for the pressing member.

Under the first one of the above-mentioned objects, according to preferred embodiments embodying the aspect of the present invention, an apparatus arranged to use a disc-shaped record bearing medium having an engaging portion, comprises rotating means engageable with the medium at its engaging portion and having a surface for receiving the engaging portion of the medium; holder means movable between a first position for receiving the medium and a second position for positioning the received medium at a predetermined position relative to the rotating means; pressing means for pressing the engaging portion of the medium against the receiving surface of the rotating means; and control means for operating the pressing means when the holder means is moved from its first to its second position.

Especially, under the second one of the above-mentioned objects, according to preferred embodiments embodying the aspect of the present invention, the control means is arranged to operate the pressing means and thereafter disable the pressing means during the movement of the holder means from its first to its second position.

Under the third one of the above-mentioned objects, according to first, second and third embodiments embodying the aspect of the present invention, the control means is arranged to disable the pressing means when the holder means reaches a predetermined position nearly before its second position. In these embodiments, the pressing means preferably has an elasticity in at least a part thereof. On the other hand, according to fourth and fifth embodiments embodying the aspect of the present invention, the control means is arranged to disable the pressing means when the resistant force exerted on the pressing means reaches a predetermined value.

In this invention, the term "record bearing medium" refers to a rotatable record bearing medium of disc-shape of the magnetic, optical, or electrostatic capacity type recording and/or reproducing system, and the term "rotating means" for the record bearing medium refers to a rotative drive member such as a spindle connected to, or driven by, a drive source such as an electric motor.

Other objects and features of the present invention will become apparent from the following description of the explanation by reference to the accompanying drawings.

BRIEF DESCRIPTION OF THE DRAWINGS

In the following, this invention will be described in connection with preferred embodiments thereof by reference to the accompanying drawings in which.

DETAILED DESCRIPTION OF THE PREFERRED EMBODIMENTS

Figure 1:
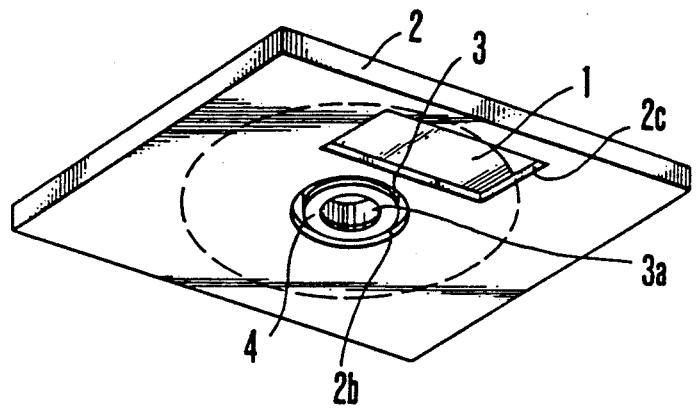
FIG. 1 is a perspective view of a prior known magnetic disc cassette.

The conventional apparatus using the disc-shaped record bearing medium (FIG. 1 and FIG. 2):

Prior to the description of a conventional apparatus using the disc-shaped record bearing medium, a prior known magnetic disc cassette will be discussed with reference to FIG. 1. In the drawings, 1 is a flexible magnetic disc constituting an example of a disc-shaped record bearing medium; 2 is a cassette containing the magnetic disc 1 and having a housing in box form as illustrated in the drawing; 3 is a center core fixedly attached to a central portion of the magnetic disc 1 and having an engaging hole 3a; 2a and 2b are apertures provided in portions of the cassette 2 in correspondence to the center core 3; 2c is a window provided in a portion of the cassette 2 so as to allow insertion of a magnetic head to be described later; and 4 is a magnetizable plate fixedly attached to the lower surface of the center core 3. The magnetic disc 1 while being contained in the cassette 2 is loaded into a recording and/or reproducing apparatus by, for example, means to be described later, and then recording or reproducing is carried out in a manner known in the art.

Figure 2:
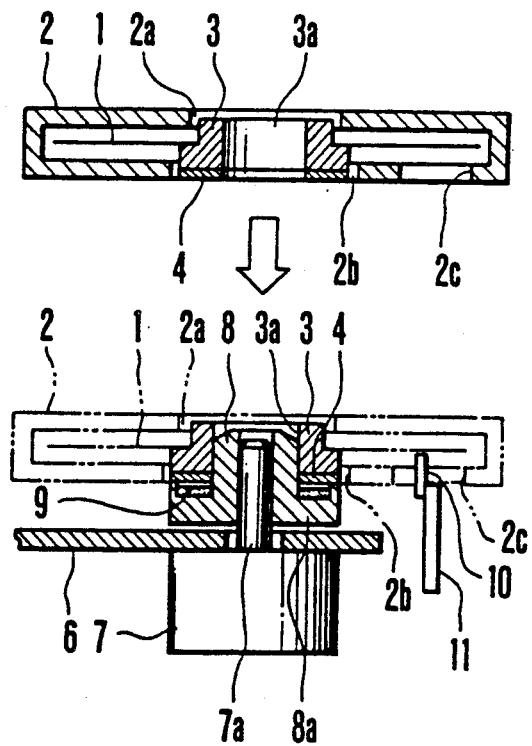
FIG. 2 is a sectional view of the main parts of a conventional apparatus.

FIG. 2 illustrates the main parts of the conventional apparatus using the disc-shaped record bearing medium in which the cassette 2, in its loaded position, is indicated by two-dotted and dashed lines. Members denoted by the same reference characters as those in FIG. 1 have similar constructions and functions to those of the members of FIG. 1. As to other members, 6 is an internal chassis of the recording and/or reproducing apparatus; 7 is an electric motor for rotation of the disc and is fixedly mounted to the chassis; 8 is a spindle exemplifying rotating means fixedly mounted on an output shaft 7a of the disc rotation motor 7. The aforesaid center core 3 is adapted to be mounted on the spindle 8 at the engaging hole 3a thereof. 10 is a magnetic head exemplifying the recording and/or reproducing head; 11 is a head carriage. 9 is a magnet fixedly mounted on the upper surface of a flanged portion 8a of the spindle 8. According to the prior art, it is by this magnet 9 and the manetizable plate 4 of the center core 3 that the center core 3 and the spindle 8 are brought into coupling with each other magnetically. By this method, however, as has been described above, it is difficult to assure that the magnetic disc 1 is maintained in a predetermined mounting surface defined by the flanged portion 8a of the spindle 8.

In another prior art example where use is made of a mechanism acting on the upper surface of the center core 3 and pressing it against the spindle 8, as has been mentioned above, the disc rotating motor 7 is caused to operate with this mechanism also as a load. The total load of the motor 7 is, therefore, increased, which becomes a cause of uneven speeds of rotation.

Figure 3:
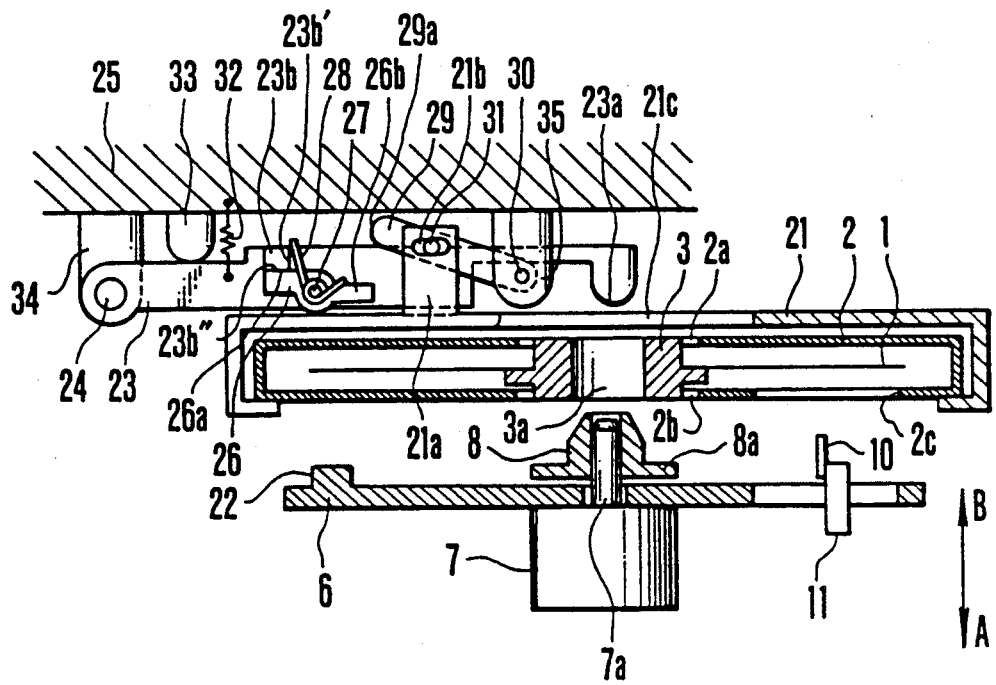
FIG. 3 is a sectional view of a first embodiment of the invention.
Figure 4:
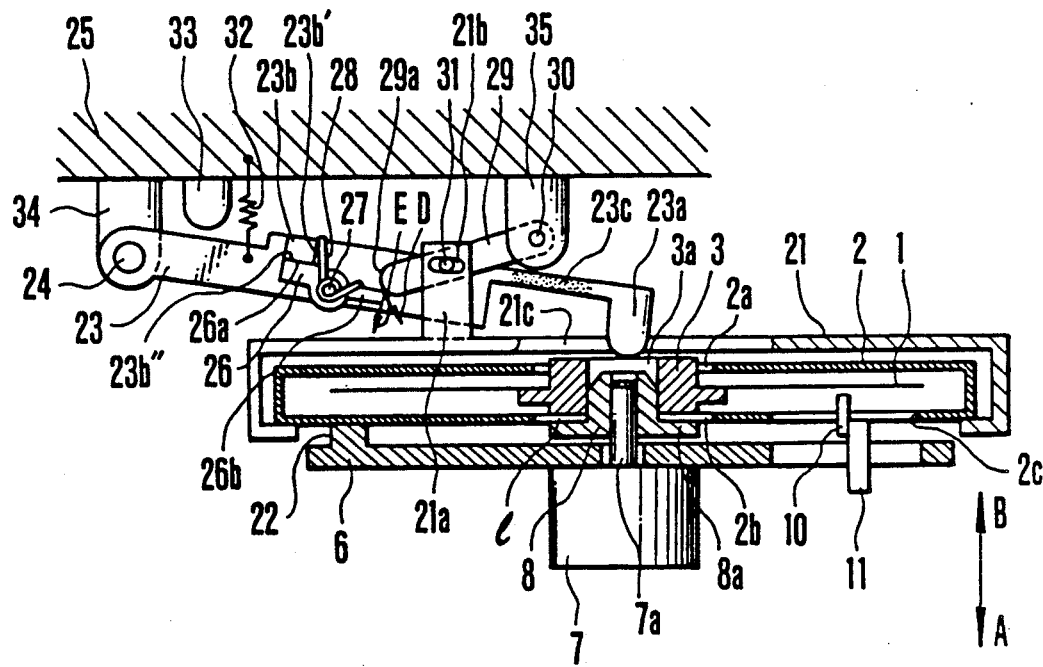
FIGS. 4 and 5 illustrate a manner in which the apparatus of FIG. 3 operates between a position where the cassette holder is pushed downward and another position where it is lifted upward.
Figure 5:
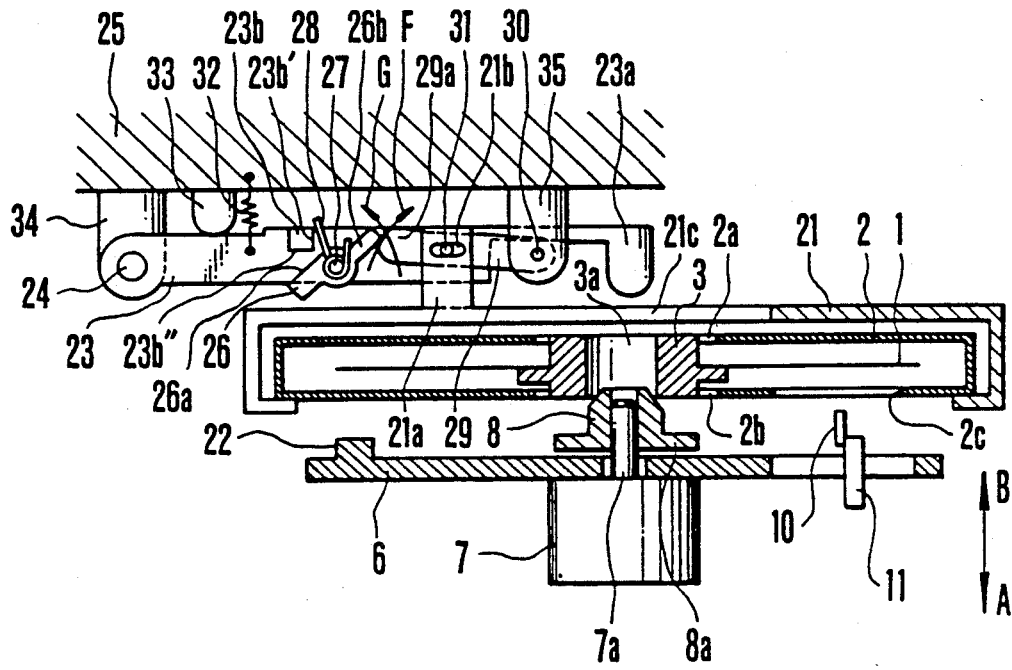

A first embodiment of the present invention is shown in FIGS. 3 to 5, wherein the same reference characters have been employed to denote parts having fundamentally similar constructions and functions to those parts in FIGS. 1 and 2, and therefore explanation is omitted. 21 is a cassette holder. The magnetic disc cassette 2 after having been inserted into and seated in the holder 21 is loaded onto a rotative drive portion. For this purpose, the holder 21 is movable between a position shown in FIG. 3, or a first position for receiving the cassette 2, and a position downwardly slightly beyond the position of FIG. 4, or a second position where the center core 3 of the magnetic disc 1 contained in the received cassette 2 is mounted on the spindle 8. It is to be noted here that though not shown the holder 21 is provided in its interior with means having a leaf spring and abutments for determining a right position of the received cassette 2 in the interior of the holder 21. 22 is a position determining part for the cassette 2, and a plurality of such parts are provided on the chassis 6. These parts may be constructed either as a unit with, or seperate from, the chassis 6. 23 is a pressing arm constituting an example of pressing means in this invention. The pressing arm 23 is pivotally mounted at a shaft 24. The shaft 24 is fixedly mounted on an armed portion 34 of another chassis 25 formed either as a unit with, or seperate from, the chassis 6. 23a is a pressing portion at the free end of the pressing arm 23. As illustrated in FIG. 4, when the pressing arm 23 turns in a clockwise direction, this pressing portion 23a pushes the center core 3 with its engaging hole 3a in engagement with the spindle 8. For this purpose, use may be made either of two pressing portions 23a having a fork shape arranged to act on respective diametrically opposite points on an annular upper surface of the center core 3 above and below the plane of FIG. 4 respectively, or of a top plate on the upper surface of the center core 3 so that the center core 3 is pushed along the entire upper surface thereof by the pressing portion 23a. 23b is a projected portion extending from the pressing arm 23 upwardly from the plane of FIG. 3 and having abutment portions 23b' and 23b".

26 is a lever rotatable about a shaft 27 mounted on the arm 23. 28 is a torsion spring wound around the shaft 27, one end of which is laid on the lever 26 and the other of which is laid on the abutment portion 23b' of the projected portion 23b of the pressing arm 23. Therefore, the lever 26 is urged by the torsion spring 28 to turn about the shaft 27 in a clockwise direction until its tail 26a abuts on the abutment portion 23b" of the projected portion 23b of the pressing arm 23. 29 is a lever with its tail end portion pivotally mounted on a shaft 30 mounted on an armed portion 35 of the chassis 25. The position of the lever 29 is so determined that when it turns in a clockwise direction, its free end portion 29a abuts on a free end portion 26b of the lever 26. The free end portion 29a of the lever 29 is formed with another suitable cam shape. 31 is a pin planted on the lever 29 and engaging in a slotted portion 21b provided in an extension 21a of the cassette holder 21. 32 is a spring urging the pressing arm 23 to turn in a counterclockwise direction to an initial position. 33 is a limiting portion for limiting the counterclockwise returning movement of the pressing arm 23. The limiting portion 33 is provided on the chassis 25.

In the above-described construction, when in the condition of FIG. 3, the magnetic disc cassette 2 is inserted into the cassette holder 21. After the magnetic disc cassette 2 has been seated in a correct position within the interior of the holder 21, then the holder 21 is moved downward or in a direction indicated by arrow A in FIG. 3. In order to do this, the holder 21 may be operatively connected to the chassis or its cover portion by, for example, a hinge provided on the backside of the device as viewed in FIG. 3 so that the holder 21 is moved downward manually or by a mechanism known to those skilled in the art. As the holder 21 moves downward, the pin 31 engaging in the slot 21b of the extension 21a moves in the direction of arrow A, whereby the lever 29 is turned in the direction of arrow D in FIG. 4. Therefore, the free end portion 29a of the lever 29 comes to contact with the free end portion 26b of the lever 26 and then pushes the lever 26 in the direction of arrow E. Since, at this time, the lever 26 is hindered from pivotal movement by its tail portion 26a resting in the abutment 23b" of the projected portion 23b of the pressing arm 23, the pressing arm 23 reacts to turn about the shaft 24 in the clockwise direction, whereby its free end or pressing portion 23a enters the interior of the holder 21 through an apertured portion 21c thereof and pushes the center core 3 at the upper surface thereof along the spindle 8 against a frictional force exerted therebetween. Here, in the position shown in FIG. 4, the holder 21 does not yet reach its lowermost possible position. Therefore, between the lower surface of the center core 3 and the upper surface or position determining surface of the flanged portion 8a of the spindle 8 lies a gap l, as illustrated in FIG. 4. Upon further downward movement of the holder 21, the lever 29 is further turned in the direction of arrow D. Therefore, the pressing arm 23 also further turns in the clockwise direction, so that its pressing portion 23 further pushes the center core 3 to eliminate the aforesaid gap l. Thus, the magnetic disc 1 is positioned correctly at a predetermined location defined by the flanged portion 8a of the spindle 8.

Because the center core 3 is usually made of plastics, the diameter of its engaging hole 3a largely varies substantially from item to item in a sense of fitting on the spindle 8. According to the above-described construction of the apparatus, as the diameter of the engaging hole 3a of the center core 3 is designed to be rather small, the range of variation of the diameter has no longer any effect on the accuracy of positioning control. Therefore, the present invention is suited to mass production. This advantage can also be expected in other embodiments of the invention to be described hereinafter.

As the cassette holder 21 further moves downward in the direction A, the lever 29 continues to turn in the direction D, finally disengaging its free end portion 29a from the free end portion 26b of the lever 26. And, at this time, a bias force in the counterclockwise direction is applied by the spring 32 on the pressing arm 23. Therefore, when the engagement of the lever 29 and the lever 26 is released, the pressing arm 23 immediately turns in the counterclockwise direction, returning to the initial position defined by the limiting portion 33.

Because the pressing arm 23, lever 26, lever 29 and cassette holder 21 may have form tolerances and the pivot shafts 24, 27 and 30 and the pin 31 also may have location tolerances, there will be some possibility that even when the pushing of the center core 3 along the spindle 8 by the pressing portion 23a of the pressing arm 23 has ended, the engagement of the free end portion 29a of the lever 29 and the free end portion 26b of the lever 26 will not released, whereby a so-called "wrenching" is caused to occur therebetween. This will lead to interfere with smooth loading operation. On this account, the pressing arm 23 is made elastic in at least a portion indicated by 23c in FIG. 4 so that when the aforesaid situation is encountered, this portion indicated at 23c is bent as illustrated in the drawing, permitting the free end portion 29a of the lever 29 to smoothly run over the free end portion 26b of the lever 26. Thus, it is made possible to assure that the engagement of both the levers is released as it moves in the direction D. The use of such elasticity in one portion (23c) of the pressing arm 23 has another advantage that as the center core 3 is pushed, even when the pressing arm 23 is overpowered, the excessive stroke is absorbed by this elastic portion 23c to prevent the center core 3, the flanged portion 8a of the spindle 8 and the pressing arm 23, or the operating mechanism (26-31) therefor from being damaged. This point is valid even in second and third embodiments of the invention to be described later.

By the counterclockwise movement of the pressing arm 23, its pressing portion 23a lifts from the center core 3 so that when the magnetic disc 1 is driven to rotate, its drive source or disc rotating motor 7 is freed from surplus load. Also the center core 3 and the spindle 8 are tightly coupled with each other by friction. Under such conditions, the magnetic disc 1 rotates while the magnetic head 10 performs recording or reproducing in a manner known in the art.

When it is desired remove the cassette 2 from the holder 21, the holder 21 is lifted in a direction indicated by arrow B by a reversed operation from the aforesaid operation of moving downward in the direction A. This step or operation is illustrated in FIG. 5. Such upward movement causes the pin 31 also to be moved upward which in turn causes the lever 29 to turn about the shaft 30 in a direction F. Though the free end portion 29a of the lever 29 contacts again with the free end portion 26b of the lever 26, it is in this case that the free end portion 29a of the lever 29 comes from below to about on the free end portion 26b of the lever 26, and therefore that the lever 26 is turned about the shaft 27 in a direction G until the engagement of the free end portion 26b of the lever 26 and the free end portion 29a of the lever 29 is released. Then, the lever 26 is returned by the spring 28 to the initial position shown in FIG. 3. Further, when the holder 21 is raised to the predetermined position (the aforesaid first position), each member returns to the position of FIG. 3. In this position, it becomes possible for the cassette 2 to be taken out from the interior of the holder 21.

Figure 6:
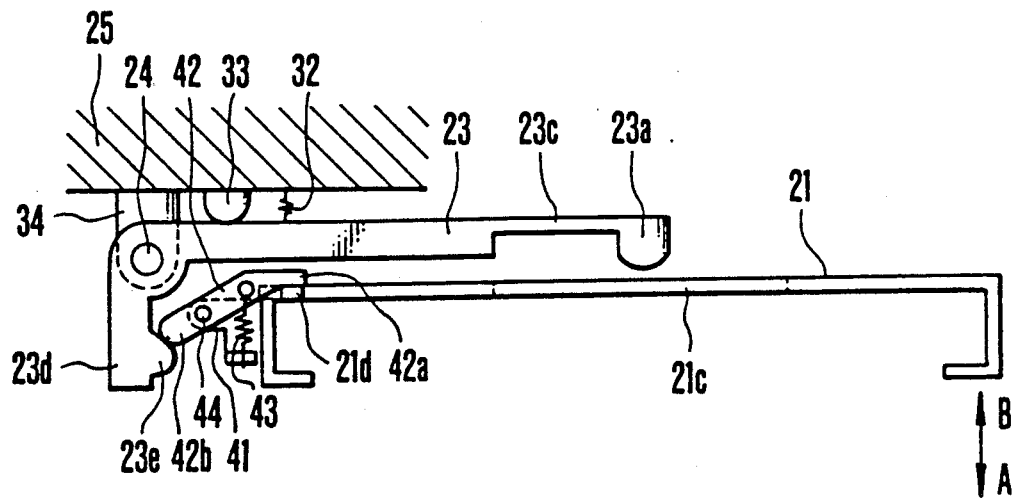
FIGS. 6 and 7 are sectional views of the main parts of second and third embodiments of the invention respectively.

A second embodiment of the present invention is shown in FIG. 6, though the disc rotating motor and spindle are not shown, these members are similarly constructed and arranged as in the first embodiment. In FIG. 6, 41 is a support member fixedly mounted to a left hand portion of the cassette holder 21 and movable as a unit therewith; 42 is a lever pivotally supported by a shaft 44 on the support member 41; 43 is a spring trained between the support member 41 and the lever 42. The lever 42 is urged by the spring 43 to turn about the shaft 44 mounted on the support member 41 in a clockwise direction as viewed in the drawing. 21d is an extension formed in a portion of the holder 21 to receive a tail end portion 42a of the lever 42 against the spring 43. 42b is a free end portion of the lever 42 abutting on a cam portion 23e provided in the tail end portion 23d of the pressing arm 23.

With such construction, when the cassette holder 21 moves downward or in the direction A in the drawing similarly to the aforesaid first embodiment, the lever 42 also moves downward, while its free end portion 42b pushes the tail end portion 23d of the pressing arm 23 at its camming surface 23e. Therefore, the pressing arm 23 turns in a clockwise direction as viewed in the drawing, while its free end or pressing portion 23a enters past the apertured portion 21c of the holder 21 into the interior of the holder 21 to push the center core 3 in fitting engagement on the spindle 8. As the holder 21 further moves downward, when the free end portion 42b of the lever 42 overruns the cam portion 23e the pressing arm 23 finishes the pushing and is turned by the spring 32 in the counterclockwise direction to the initial position, whereby its free end pressing portion 23a moves away from the center core 3.

On the other hand, when the holder 21 is raised from its downmost position to the direction B in the drawing, the free end portion 42b of the lever 42 comes from the reversed direction to that described above to abut on the cam portion 23e in the tail end portion 23d of the pressing arm 23. Since the spring 43 is weak, it is at this time that while the pressing arm 23 is left stationary, the lever 42 turns in a counterclockwise direction as viewed in the drawing. Then when the holder 21 rises to the predetermined position, the lever 42 returns to the initial position shown in FIG. 6. By one series of these operations, similarly to the above-described first embodiment, it is made possible to actuate the pressing arm 23 in response to downward movement of the holder 21 to thereby set the center core 3 on the spindle 8 and thereafter to remove the pressing portion 23a of the pressing arm 23 from the depression on the center core 3.

Figure 7:
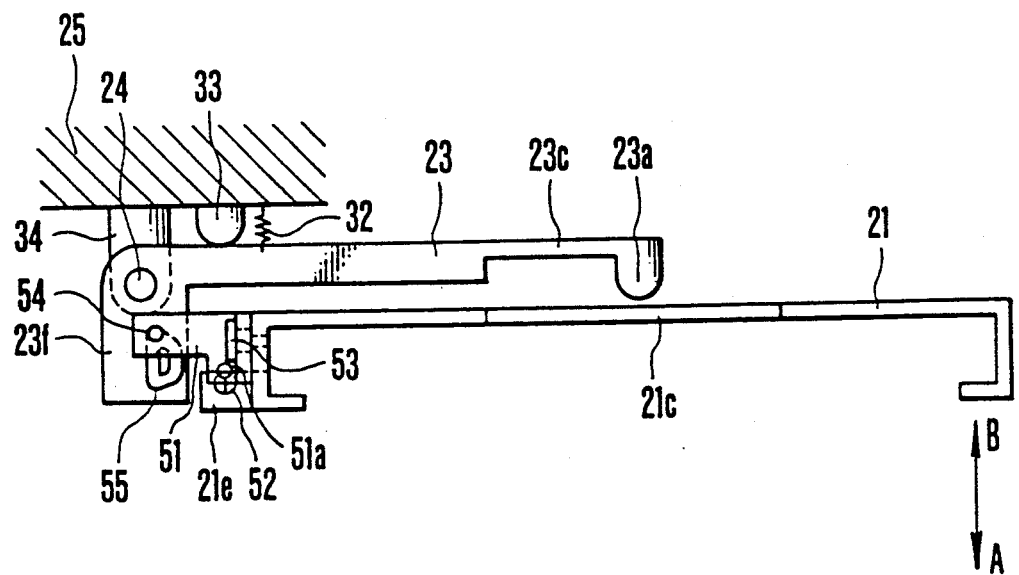
Figure 8:
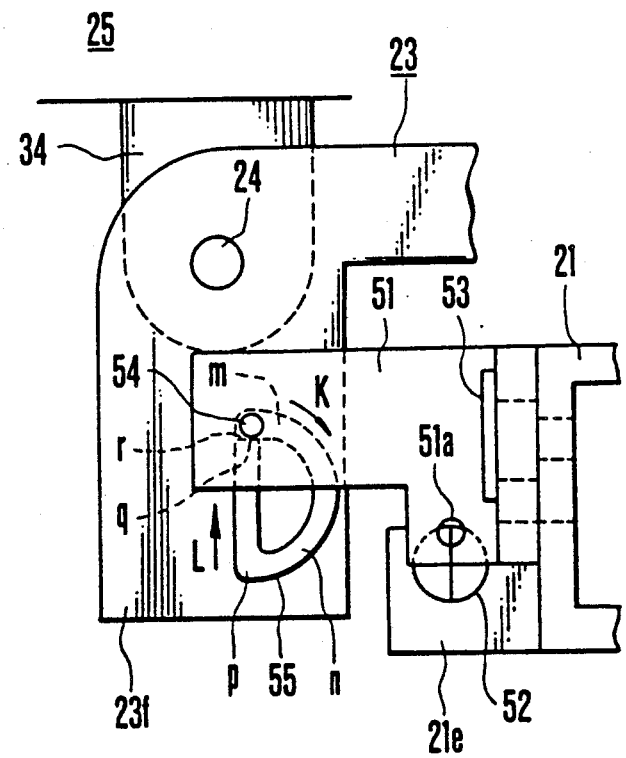
FIG. 8 is a fragmentary elevational view in enlarged scale of a part of the apparatus of FIG. 7.

A third embodiment of the present invention is shown in FIGS. 7 and 8, wherein 21e is an extension provided on the left hand side portion of the cassette holder 21; 51 is a slide lever; and 52 is a spring trained between the extension 21e and a hole 51a of the slide lever 51 so that the slide lever 51 is urged toward the back of the paper. 53 is a pin fixedly mounted on the left hand side portion of the holder 21 to guide sliding movement of the slide lever 51 in a direction perpendicular to the paper. 54 is a pin planted on the slide lever 51 and extending backward from the paper into a groove 55 provided in the surface of a tail end portion 23f of the pressing arm 23. The groove 55 is, as illustrated in greater detail in FIG. 8, formed in the shape of a letter "D" as viewed from the front of the paper with its portions indicated by "m", "n" and "p" having a constant depth, another portion indicated by "q" having gradually shallower depths as the distance from below to above increases, and the top end indicated at "r" being followed by a sudden drop, so that as the holder 21 moves first downward and then upward, the pin 54 is caused to circulate in the closed groove 55, always first to a direction K followed by a direction L.

With such construction, similarly to the above, when the holder 21 moves downward or in the direction A in the FIG. 7, the pin 54 moves along portion "m" of the groove 55 in the direction K so that the pressing arm 23 turns about the shaft 24 in a clockwise direction as viewed in the drawings. By the clockwise movement of the pressing arm 23, its free end or pressing portion 23a enters similarly to the above through the apertured portion 21c of the holder 21 into the interior of the holder 21 to push the center core 3 along the spindle 8. Upon further downward movement of the holder 21 in the direction A, the pin 54 moves along the portion "n" in the direction K, whereby the pressing arm 23 is turned in a counterclockwise direction. Just when the pin 54 arrives at the portion, "p", the pressing arm 23 returns to the initial position, so that its free end or pressing portion 23a moves away from the center core 3.

On the other hand, when the holder 21 rises in the direction B from its downmost position, the pin 54 moves along the groove 55 from the portion "p" to the portion "q" in the direction L. Since, in the portion indicated by "q", the depth of groove 55 becomes shallower, the slide lever 51 slidingly moves toward the front of the paper against the spring 52. When the top end of the groove 55 indicated by "r" is reached, the slide lever 51 moves toward the back of the paper by the spring 52, thus regaining the initial position. During the movement of the pin 54 in the direction L, the arm 23 remains stationary. By the process through a series of these operations, it is made possible similarly to the aforesaid first and second embodiments to actuate the pressing arm 23 in response to downward movement of the holder 21, whereby the center core 3 is pushed onto the spindle 8, and thereafter to remove the pressing portion 23a of the pressing arm 23 from the center core 3.

Here in the first to the third embodiments described above, for example, the following variations are possible.

For example in the apparatus of the type in which the cassette holder 21 is automatically moved upward and downward by an electric motor as the drive source, the power of this drive source may be utilized in operating the pressing arm 23 in such a manner that after the center core 3 is set on the spindle by the pressing arm 23, the pressing arm 23 is returned to the initial position. Also though the foregoing embodiments have been described in connection with such an arrangement of the pressing arm 23 that it is at a time during the loading operation of the magnetic disc cassette 2 that the free end or pressing portion 23a of the pressing arm 23 departs from the center core 3, another different arrangement may be employed such that it is after the cassette loading operation has been completed that the pressing portion 23a moves from the center core 3. For example, in the second embodiment, the cam portion 23e of the pressing arm 23 in FIG. 6 may be otherwise formed to such a shape that the cam lift gradually increases as it goes from above to below as viewed in the drawing, and then suddenly decreases from its maximum position. In the third embodiment, the shape of the groove 55 may be modified from the shape of the letter "D" to a right triangle facing toward the right as viewed in the drawing.

Figure 9:
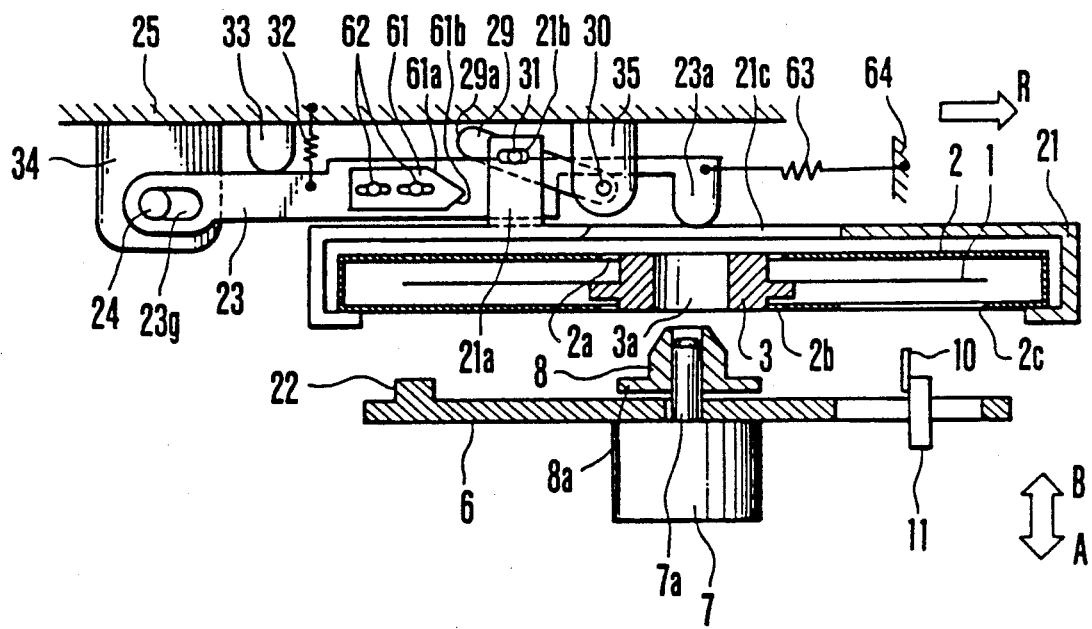
FIG. 9 is a sectional view of a fourth embodiment of the invention.
Figure 10:
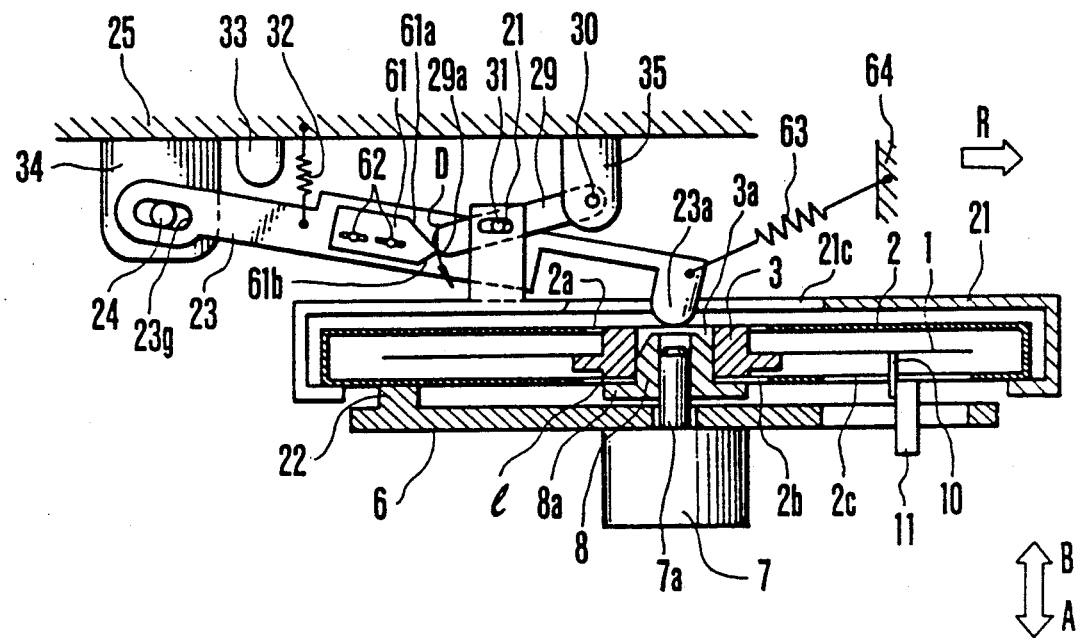
FIGS. 10 and 11 illustrate a manner in which the apparatus of FIG. 9 operates between a position where the cassette holder is pushed downward and another position where it is lifted upward.
Figure 11:
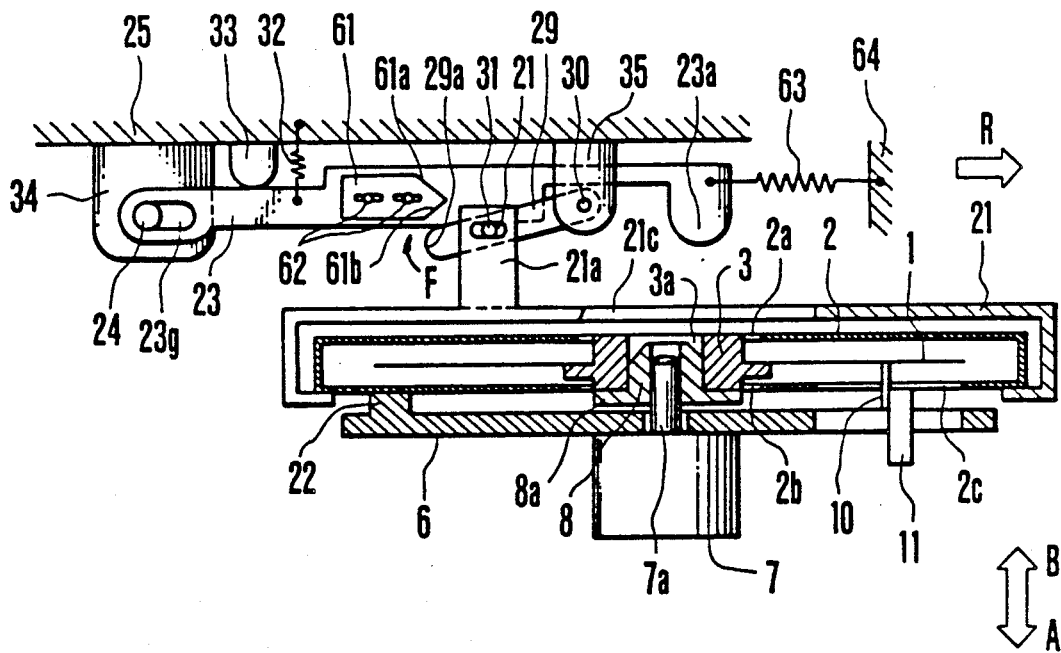

A fourth embodiment of the present invention is shown in FIGS. 9 to 11, wherein the same reference characters have been employed to denote the parts having fundamentally similar structures and functions to those of the parts shown in FIGS. 1 to 8, and their explanation is omitted.

The pressing arm 23 is here modified with its tail end portion having a slot 23g in which engages the shaft 24 on the chassis 25. Besides its capability of pivotal movement about the shaft 24, therefore, the pressing arm 23 can also move linearly along the slot 23g in the longitudinal direction thereof. A spring 63 urges the pressing arm 23 to move in the direction of arrow R so that the shaft 24 is normally in contact with the left hand side of the slot 23g (FIG. 9). The opposite end of the spring 63 is fixedly attached to a chassis 64. 61 is a cam used instead of the lever 26 in FIGS. 3 to 5 and fixedly mounted on the pressing arm 23. The position of the cam 61 relative to the pressing arm 23 can be adjusted by slits cut therein and fastener screws engaging in the respective slits. Though two pairs of slit and screw are shown, its number is not limitative. With this cam 61 on the pressing arm 23 cooperates a lever 29 similar to that shown in FIGS. 3 to 5 in such a manner that when it turns in a counterclockwise direction (direction D in FIG. 10), its free end portion 29a abuts on a camming surface 61a of the cam 61, and when it turns from the below in a clockwise direction (direction F in FIG. 11), its free end portion 29a abuts on another camming surface 61b of the cam 61.

The other parts than the above are fundamentally similar in construction to those of the first embodiment.

With such construction, after the magnetic disc cassette 2 has been inserted into and seated in the holder 21, when the holder 21 is moved downward or in the direction A in FIG. 9, as the holder 21 moves downward, the pin 31 engaging in the slotted portion 21b of its extension 21a moves in the direction A whereby the lever 29 is turned in the direction D in FIG. 9. Therefore, the free end portion 29a of the lever 29 abuts on the camming surface 61a of the cam 61. And since the cam 61 is fixed to the pressing arm 23, the pressing arm 23 then turns about the shaft 24 in the clockwise direction. Thereby its free end or pressing portion 23a advances past the apertured portion 21c of the holder 21 into the interior of the holder 21 to push the center core 3 along the spindle 8. This operative position is illustrated in FIG. 10. It is to be noted that in the position of FIG. 10, the pushing of the center core 3 is not yet finished. Therefore, a gap 1 is left between the lower surface of the center core 3 and the upper surface of the flanged portion 8a of the spindle 8. Then, upon further downward movement of the holder 21 in the direction, A, the lever 29 further turns in the direction D which also causes the pressing arm 23 to further turn in the clockwise direction while further pushing the center core 3, finally bringing the lower surface of the center core 3 into abutting contact with the upper surface of the flanged portion 8a of the spindle 8 with the removal of the aforesaid gap 1.

Even when the holder 21 further moves downward from this position, the pressing arm 23 can no longer turn in the clockwise direction, but the lever 29 is allowed to further turn in the direction D. Therefore, the pressing arm 23 is moved to the left along the slot 23g of its tail end portion against the spring 63 by the leftward directional force component of the pressure on the free end portion 29a of the lever 29 in reaction to the camming surface 61a of the cam 61. As a result, the free end portion 29a of the lever 29 moves away from the cam 61. Thereby the pressing arm 23 is turned in the counterclockwise direction by the bias force of the spring 32, returning to the initial position defined by the stopper member 33.

By the way, because of the form tolerances of the pressing arm 23, the free end portion 29a of the lever 29 and the cassette holder 21 and the location tolerances of the pivot shafts 24 and 30 and the pin 31, it will often happen that the pressure of the free end or pressing portion 23a of the pressing arm 23 on the center core 3 becomes excessive, or that even when the setting of the center core 3 has finished, the free end portion 29a of the lever 29 does not yet move away from the camming surface 61a of the cam 61. If so, a so-called "wrenching" will result therebetween, and a smooth loading operation is hindered from being performed. On this account, in the foregoing first to third embodiments of the invention, such drawback has been eliminated by giving elasticity to a portion (23c) of the pressing arm 23. In this fourth embodiment, on the other hand, the pressing arm 23 is provided with the longitudinally elongated slot 23g at the tail end portion thereof, and it is at this slot 23g that the shaft 24 is made to cooperate in engagement therewith, so that when the resistant force (reaction) from the center core 3 to the pressing arm 23 exceeds a certain limit, the pressing arm 23 is caused to move to the left against the bias force of the direction R by the spring 63. Therefore, the free end portion 29a of the lever 29 smoothly departs from the camming surface 61a of the cam 61, and the pressing arm 23 immediately turns in the counterclockwise direction to the initial position. This enables the apparatus to be loaded with the magnetic disc 1 smoothly and safely.

When it is desired to remove the cassette 2 from the holder 21, the reverse operation to that in which the holder 21 was moved downward in the direction A is carried out, so that the holder 21 moves upward in the direction B in FIG. 11. Such upward movement causes the pin 31 to be also moved upward. Therefore the lever 29 is turned about the shaft 30 in the direction F. Its free end portion 29a is brought, at this time, from below as viewed in the drawing into abutting contact with the camming surface 61b of the cam 61. In this case, too, the pressing arm 23 moves to the left against the bias force of the spring 63. Therefore, the free end portion 29a of the lever 29 smoothly departs from the camming surface 61b of the cam 61, returning to the initial position of FIG. 9. In this position, the cassette 2 can be taken out of the holder 21.

Figure 12:
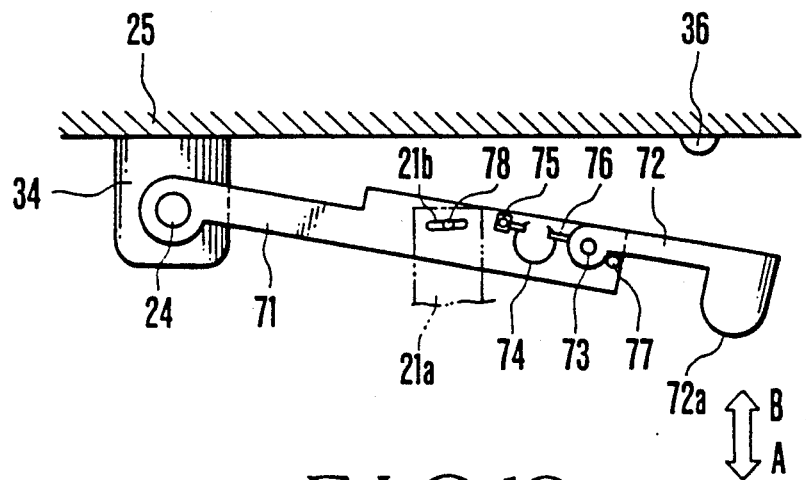
FIGS. 12, 13 and 14 illustrate the main parts of a fifth embodiment of the invention, with FIG. 12 in a sectional view in an operative position where a pressing member is pressing the center core of the magnetic disc, FIG. 13 in a sectional view in another operative position where the pressing member is escaped or disabled by a reaction or a resistant force from the center core, and FIG. 14 in a sectional view in another operative position where the pressing member has returned to the initial position.
Figure 13:
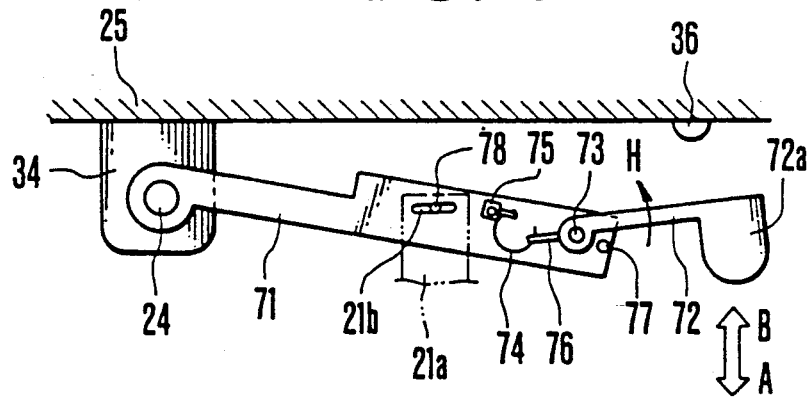
Figure 14:
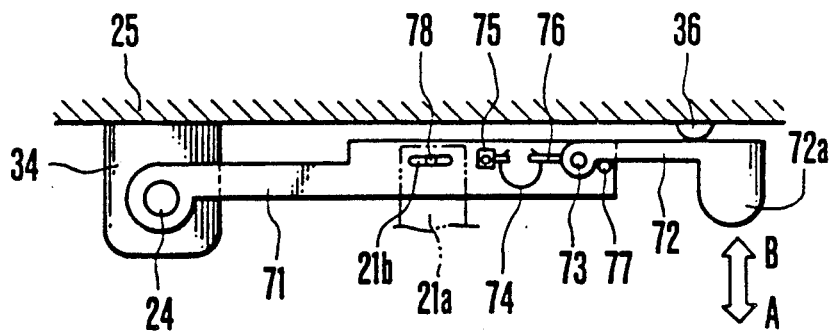
Figure 15:
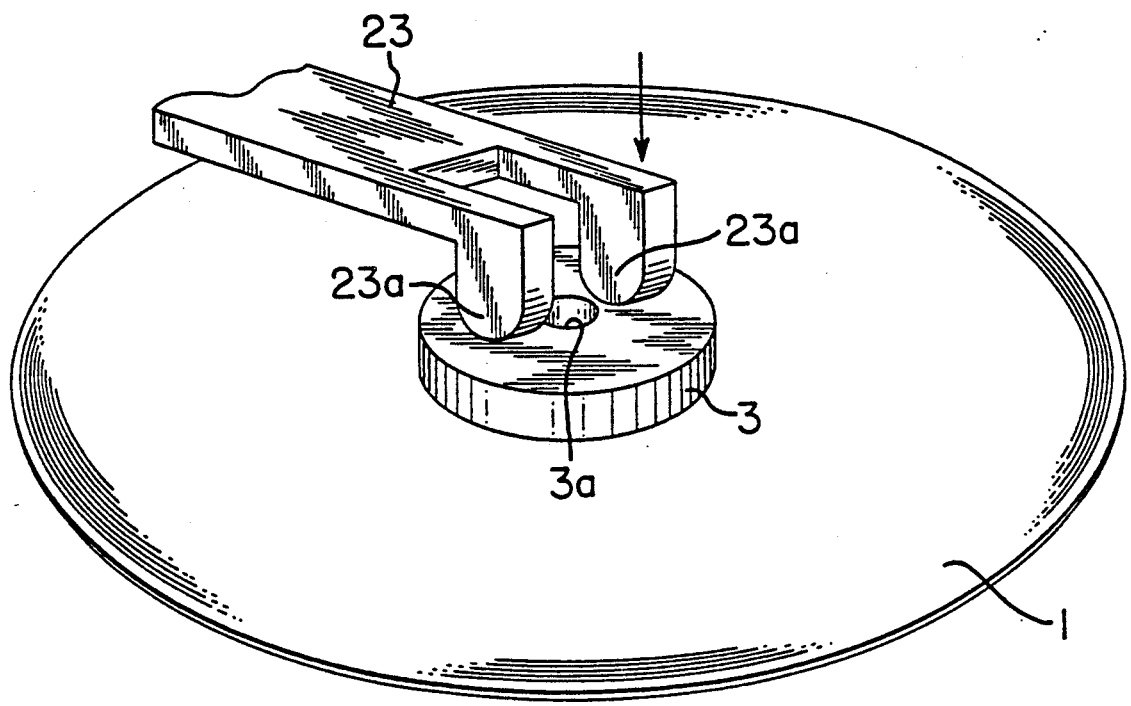
FIG. 15 illustrates a specific structure of the pressing arm.

A fifth embodiment of the present invention shown FIGS. 12 to 14 employs a toggle or snap spring mechanism responsive to excess of the resistant force (reaction) from the center core to the pressing member above a certain limit for allowing the pressing member to escape in a different direction from the pressing direction.

In FIGS. 12 to 14, the pressing member comprises a base portion 71 and a movable portion 72 which is pivotally mounted at a shaft 73 planted on the base portion 71. 72a is a free end or pressing portion of the movable portion 72 performing the function of pushing the center core 3 similar to the free end or pressing portion 23a of the pressing arm 23 in FIGS. 3 to 11. 74 is a toggle or snap spring of which one end is fixed to a support portion 75 provided on the base portion 71 and the opposite end of which is fixed to an extension 76 provided on the movable portion 72. 77 is a position limit pin for the movable portion 72 and is planted on the base portion 71. 78 is a pin planted on the base portion 71 and engaging in a slot 21b of the extension 21a of the cassette holder 21. 36 is a limit portion for the movable portion 72 provided in the chassis 25. Of the other parts, those denoted by the same reference characters as in the foregoing drawings have similar constructions and functions to those previously illustrated, and the cassette holder 21, motor 7, spindle 8 and magnetic head 10 though not shown here are similarly constructed and arranged as in the above.

With such construction, when the holder 21 is moved downward in the direction A from the position of FIG. 14, the pin 78 planted on the base portion 71 moves downward, whereby the base portion 71 and the movable portion 72 are turned about the shaft 24 in a clockwise direction, while simultaneously the free end pressing portion 72a of the movable portion 72 pushes the center core 3 along the spindle 8. Here, if the resistant force (reaction) from the center core 3 is below a certain limit, the toggle or snap spring 74 is in a first stable position, maintaining the movable portion 72 in a relative position shown in FIG. 12 to the base portion 71. As the base portion 71 and movable portion 72 further turn to finish the setting of the center core 3 on the spindle 8, when the resistant force from the center core 3 then exceeds that certain limit, the toggle or snap spring 74 transits to a second stable position as illustrated in FIG. 13, whereby the movable portion 72 is turned relative to the base portion 71 in the direction h in the drawing, thus escaping to a different direction to the pressing direction. Therefore, the free end or pressing portion 72a leaves the center core 3. This enables achievement of a stable loading operation.

On the other hand, the cassette holder 21 is moved from the downmost position in the direction B for the purpose of taking out the cassette 2. As the pin 78 moves upward, the base portion 71 is caused to turn in a counterclockwise direction. At a point during this counterclockwise movement of the base portion 71, the movable portion 72 abuts on the limiting portion 36. After that, the movable portion 72 turns relative to the base portion 71 in the reversed direction to the direction H. And, at a time during this rotative movement of the movable portion 72, the toggle or snap spring 74 transits to the aforesaid first stable position. Thus, the movable portion 72 returns to the relative position shown in FIGS. 12 and 14 to the base portion 71. Then when the holder 21 reaches the predetermined position, the initial condition shown in FIG. 14 is regained.

Incidentally, instead of the aforesaid toggle or snap spring mechanism, a click mechanism may be used to effect an equivalent result.

It is obvious that none of the first to the fifth embodiments described above is incompatible with the simultaneous use of coupling means based on the magnetic force in the center core 3 and the flanged portion 8a of the spindle as in the prior art, and the first to the fifth embodiments are applicable to the conventional apparatus described in connection with FIGS. 1 and 2 without any alternation.

As has been described in greater detail above, according to the present invention, by a simple mechanism it is made possible to set the record bearing medium on the rotating drive portion accurately and to assure that the record bearing medium is always well aligned to the recording and/or reproducing head. Particularly because the center core of the record bearing medium is usually made of plastics, for easy fitting on the rotating drive, the tolerance of its inner diameter is large. The use of the above-described mechanism provides the possibility of designing its inner diameter to be rather smaller so that the tolerance on the inner diameter of the center core has a far lesser influence on the accuracy and reliability of location control as the pressing member works when the record bearing medium is loaded. This feature is also suited to mass production.

Also since the operation of that mechanism is controlled in such a manner that the aforesaid pressing member is first actuated to bring the record bearing medium into fitting engagement with the rotating drive means and thereafter this pressing member is removed from the record bearing medium, during recording or reproduction the pressing member never adds any load on the rotating means, thereby providing the advantage of reducing the size of the rotating means.

Also in particular, as illustrated in the first to the third embodiments, the pressing member is formed with elasticity in a portion thereof, or as illustrated in the fourth and fifth embodiments, the pressing member is so constructed and so arranged that when the resistant force (reaction) from the record bearing medium acting on the pressing member exceeds a certain limit, the pressing member moves in a different direction from the pressing direction, whereby safe and smooth loading operation can always be realized despite form tolerances and location tolerances of the pressing member or of those members which constitute the operating mechanism therefor.

What we claim:

1. A disc loading apparatus arranged to handle a disc having an engaging portion at a central portion of said disc, comprising:

(A) rotating means for rotating said disc, said rotating means having an engageable portion with said engaging portion of the disc;

(B) pressing means for pressing said engaging portion of the disc against said engageable portion of the rotating means to engage the engaging portion and said engageable portion; and (C) control means for controlling said pressing means, said control means being arranged to cause said pressing means to press the engaging portion of said disc to engageable portion of said rotating means for engagement in response to that said disc is being carried on said rotating means, and releasing the pressing operation of said pressing means in response that a resistant force exerted on the pressing means has reached a predetermined value.

2. An apparatus according to claim 1, further comprising:
- a recording or reproducing head;
- holder means for holding the disc, said holder means being movably supported with respect to said disc loading apparatus and movable between a first position for receiving and holding the disc at which said head and said disc are relatively spaced apart from each other, and a second position for positioning the received disc at an opposing position to said head through a third position between said first position and said second position and just before said second position, said opposing position being a position at which said head and said disc are relatively closer to each other, and said second position enabling recording and/or reproducing by said head on said disc;
- said control means causing said pressing means to operate in response to the movement of said holder means from said first position to said third position to press the engaging portion of said disc to the engageable portion of said rotating means for engagement, and releasing the pressing action of said pressing means on said disc in response to the movement of said holder means from said third position to said second position, said control means being arranged to disable and pressing means when a resistant force exerted on the pressing means has reached a predetermined value.

3. An apparatus according to claim 2, wherein said control means is provided on said holder means.

4. An apparatus according to claim 1, wherein said pressing means is resilient.

5. A disc loading apparatus using a disc including a center core having an engaging hole at a center of said center core, comprising:
(A) rotating means for rotating said disc, said rotating means having a spindle engageable with said engaging hole;
(B) pressing means for pressing said center core of said disc against said spindle to engage said engaging hole of said center core with said spindle, and for releasing the pressing operation of said pressing means in response that the pressing force for said pressing means against to said center core of said disc has reached a predetermined value.

6. An apparatus according to claim 5, further comprising:
- a recording or reproducing head;
- holder means for holding the disc, said holder means being movably supported with respect to said disc loading apparatus and movable between a first position for receiving and holding the disc at which said head and said disc are relatively spaced apart from each other, and a second position for positioning the received disc at an opposing position to said head through a third position between said first position and said second position and just before said second position, said opposing position being a position at which said head and said disc are relatively closer to each other, and said second position enabling recording and/or reproducing by said head on said disc; and
- said control means causing said pressing means to operate in response to the movement of said holder means from said first position to said third position to press the engaging portion of said disc to the engageable portion of said rotating means for engagement, and releasing the pressing action of said pressing means on said disc in response to the movement of said holder means from said third position to said second position, said control means being arranged to disable and pressing means when a resistant force exerted on the pressing means has reached a predetermined value.

7. An apparatus according to claim 5, wherein said pressing means is resilient.

8. An apparatus according to claim 6, wherein said pressing means includes:
- a first member operatively connected with said holder means and movable in response to the movement of the holder means;
- a second member operatively connected with said pressing means and engageable with said first member; and
- a third member for retaining the engagement of said first and second members, said third member releasing retention of said engagement when the resistant force exerted on the pressing means reaches said predetermined value, said first and second members being arranged to operate the pressing means through the engagement therebetween when the holder means is moved from said first to said third position.

9. An apparatus according to claim 5, wherein said pressing means is a bi-stable member which has a first stable position for pressing the disc against said rotating means by a predetermined pressing force and a second stable position for separating from the disc on said rotating means.

10. A disc mounting apparatus, comprising:
(A) a spindle, having a flange portion for mounting a disc, for rotating the disc mounted on said flange portion; and
(B) disc mounting means for mounting the disc on said flange portion of said spindle, said disc mounting means having pressing means for pressing the center of the disc against the spindle to mount the disc on said flange portion and releasing the pressing operation and separating from the disc as the resistant force exerted on the pressing means reaches a predetermined value.

11. An apparatus according to claim 10, wherein said pressing means is resilient.

12. An apparatus according to claim 10, wherein said pressing means is a bi-stable member which has a first stable position for pressing the disc against said spindle by a predetermined pressing force and a second stable position for separating from the disc on said spindle.

* * * * *